United States Patent Office 3,521,914
Patented July 28, 1970

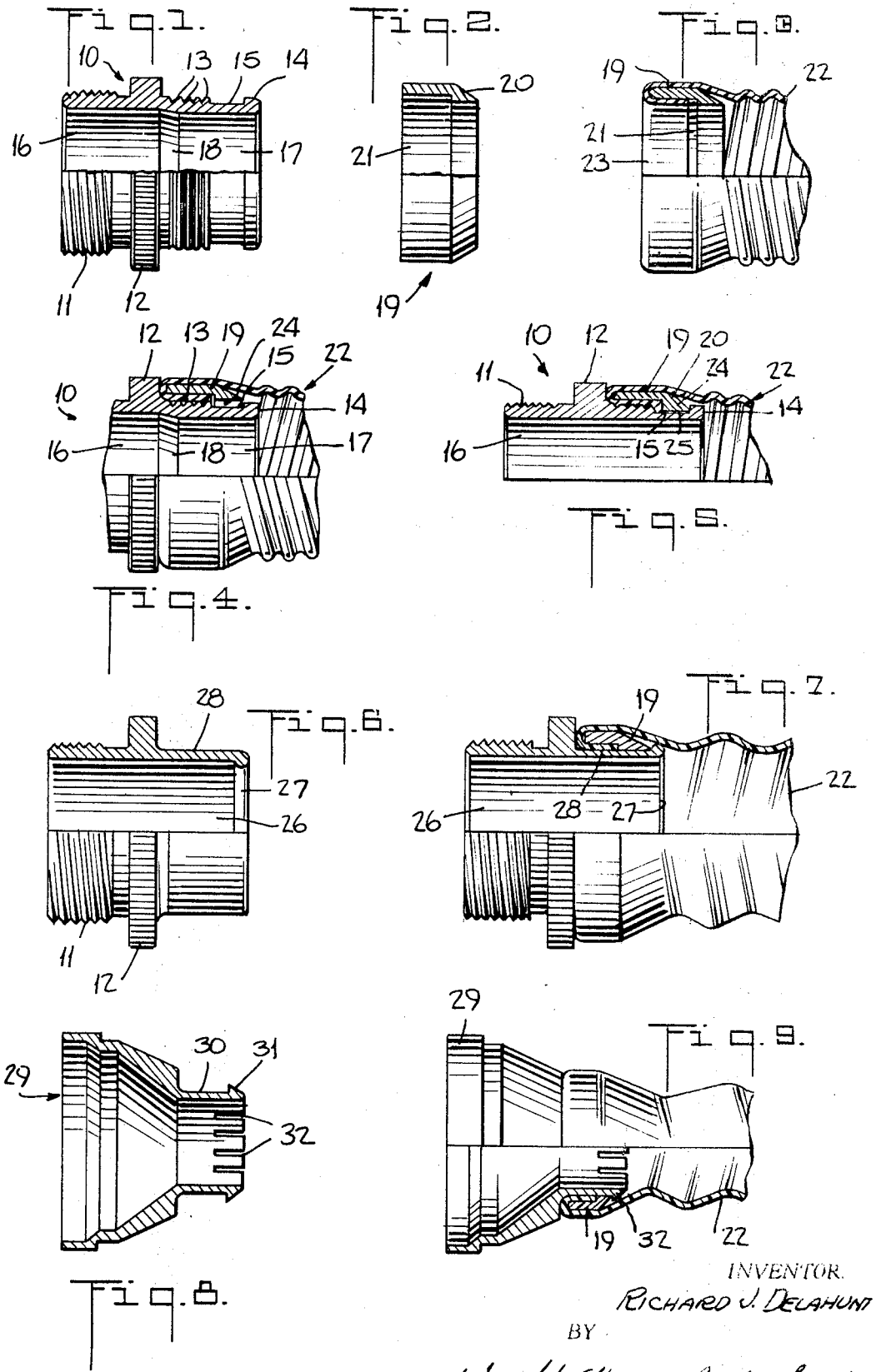

3,521,914
ELECTRICAL PLASTIC CONDUIT END FITTING AND ASSEMBLY
Richard J. Delahunty, Chester, N.J., assignor to Co-Operative Industries, Inc., Chester, N.J., a corporation of New Jersey
Filed Sept. 19, 1968, Ser. No. 760,754
Int. Cl. F16l 33/20; H02g 15/02
U.S. Cl. 285—240          6 Claims

ABSTRACT OF THE DISCLOSURE

A sleeve with a counterbore fits within the end of a thin-walled plastic conduit, the end of the conduit being cuffed inwardly about the end of the sleeve and extending into the counterbore. A tubular body fits within the sleeve and has at least a portion expandable to interlock therewith for preventing axial separation. At the same time, the body member confines the end of the conduit within the counterbore of the sleeve.

---

The present invention relates to an end fitting for attachment to the end of a thin-walled plastic conduit and, more particularly, to an end fitting for a conduit for housing electric wiring.

In the aerospace field, electric cable harnesses are quite commonplace. Heretofore, where it was desired to run a plurality of wires or conductors from one point to another, expensive cables were employed in order to withstand ambient conditions as well as conduct electricity as required. Considerable economy and convenience can be achieved by housing multiple conductors within protective conduits. Recently, conduits for electric wiring have been developed made from plastic material, particularly, polytetrafluoroethylene resin. Such conduits are thin walled and helically corrugated for flexibility. It has been found, however, that when such conduits are used on aircraft or other aerospace vehicles, the effects of rapid ascent and descent cause a breathing action which introduces moisture or corrosive fluids from the external environment into the conduits unless the conduits are hermetically sealed. The entry of such fluids creates a potential hazard for the electrical system.

It is therefore an object of the present invention to provide a lightweight, efficient, economical, and fitting for thin walled plastic conduits capable of establishing a reliable hermetic seal when assembled therewith.

Fittings are known for use with such conduits, but they are either expensive to manufacture because of highly critical manufacturing tolerances, or they are incapable of producing the necessary hermetic seal. It is, therefore, a further object of the present invention to provide a fitting which overcomes the aforesaid disadvantages.

In accordance with the present invention, there is provided an end fitting for attachment to the end of a thin-walled plastic conduit comprising a sleeve having one end externally tapered for insertion into the bore of the conduit, the opposite end of the sleeve being provided with a counterbore for receiving the end of the conduit upon its being cuffed inwardly about the opposite end of the sleeve, and a tubular body member having one end for insertion without rotation into the cuffed end of the conduit, the end of the body member having an external axial region which is coextensive with the counterbore upon the insertion and which at least initially upon insertion has a diameter less than that of the counterbore by approximately twice the nominal wall thickness of the conduit, and a region at the forward end of the end of the body member which is expandable radially outwardly to engage and interlock with the tapered end of the sleeve.

In accordance with a further aspect of the invention, there is provided an assembly comprising the aforesaid end fitting and a thin-walled plastic conduit wherein the conduit extends over the sleeve from the tapered end to the opposite end and reentrantly within the counterbore where it is confined by the presence of the body member.

The invention will be better understood after reading the following detailed description of certain preferred embodiments thereof with reference to the appended drawings in which:

FIG. 1 is an elevational view partly in section showing a tubular body member prior to assembly;

FIG. 2 is an elevational view partly in section showing the sleeve employed in the various embodiments;

FIG. 3 is an elevational view partly in section showing the sleeve of FIG. 2 and a conduit during a preliminary stage in the assembly of the fitting;

FIG. 4 is a similar view showing the assembly after insertion of the body member;

FIG. 5 is a similar view showing the completed assembly after radial expansion of the nipple portion of the body member;

FIG. 6 is a view similar to FIG. 1 showing a modification thereof;

FIG. 7 is a view partly in section showing a completed assembly employing the body member of FIG. 6;

FIG. 8 is a sectional view showing a further embodiment of the body member; and

FIG. 9 is a view partly in section showing the completed assembly employing the body member of FIG. 8.

Throughout the several figures of the drawings, the same reference numerals will be employed to designate the same or similar parts therein.

Referring to FIG. 1, there is shown a tubular body member designated generally by the reference numeral 10. For simplicity, a male coupling member has been selected for illustration. Hence, the body member 10 is provided with the male threads 11 at one end thereof. Such threads meet in known fashion with a coupling nut on a female member. Obviously, a coupling nut or an adapter to suit a multipin connector could be provided on the end of the body member 10 instead of the male threads 11. This is to be understood with respect to all the various embodiments described herein without further comment.

An externally knurled shoulder or enlargement 12 is provided at an intermediate region of the body member by means of which the fitting can be grasped for making a connection. A region is provided adjacent the shoulder 12 which contains one or more (here shown as four) annular ribs 13 with axial spacing therebetween. Between the ribs 13 and the forward end 14 of the body member, is an annular groove or channel 15. The bore of the body member is divided into two zones 16 and 17 of differing diameter connected by a transition zone 18, the zone 17 having the smaller diameter.

FIG. 2 shows the sleeve designated by the numeral 19 as having one end provided with an external taper 20 and the other end provided with a counterbore 21.

FIG. 3 shows the sleeve 19 installed within the end of a thin walled plastic conduit 22 having helical convolutions. The end of the conduit 22 is cuffed inwardly at 23 so as to extend within the counterbore 21 of the sleeve 19. It will be observed, that the wall thickness of the conduit 22 approximates the radial dimension of the counterbore 21.

Referring now to FIG. 4, it will be seen that the forward end 14 of the body member 10 is insertable within the sleeve 19 with the conduit 22 cuffed thereabout. The diameter of the forward end 14 of the body member as well as the diameter of the ribs 13 is selected to make a sliding fit with the sleeve and conduit assembly. That is, the annular ribs 13 occupy an axial region which is coextensive with the counterbore 21 upon insertion of the nipple portion of the body member as seen in FIG. 4. At this point in the assembly, the diameter of the ribs 13 is less than that of the counterbore by approximately twice the nominal wall thickness of the conduit.

After the parts have been interfitted as shown in FIG. 4, an expanding tool can be formed through the bore of the body member 10 to expand the zone 17 to the same diameter as the zone 16. This will result in an assembly as shown in FIG. 5 wherein the annular ribs 13 become embedded in the end of the tubing 22 compressing the latter against the wall of the counterbore in the sleeve 19. The noncounterbored portion of the sleeve 19 at 24 now projects into the channel 15 in the body member with only a nominal clearance 25 therebetween. The forward end 14 of the body member now is expanded radially outwardly to engage and interlock with the tapered end 20 of the sleeve 19.

It should be apparent from a consideration of FIG. 4 that the axial extent of the channel 15 is slightly greater than the noncounterbored section 24 of the sleeve 19. This avoids the necessity of accurate tolerance and allows for any slight rippling of the conduit as it bends around and enters reentrantly the counterbore of the sleeve 19. That is, the greater axial extent of the channel 15 allows for slight variation in the axial positioning of the subassembly of FIG. 3 relative to the body member 10 prior to expansion of the region 17. Upon expansion of the region 17, the body member has a uniform bore and a good hermetic seal is established by the grip secured upon the end of the conduit 22.

While various materials can be used in fabricating the two parts which make up the fitting, it is presently preferred to make both parts from aluminum or an alloy thereof. Particularly for aerospace use, the material should be light in weight, have the necessary ductility for expansion of the bore of the body member, and sufficient strength to ensure a long-lived, satisfactory connection to the conduit.

In those cases where a good hermetic seal is not required between the fitting and the conduit, a modified form of the fitting as shown in FIGS. 6 and 7 can be employed. This modification of the fitting employs the same sleeve 19 as shown in FIG. 2 while utilizing a modified body member as shown in FIG. 6. As seen therein, the nipple portion of the body member has a uniform diameter bore 26 except for an inwardly directed enlargement or bead 27 at the forward end thereof. The outer surface 28 of the nipple portion is also cylindrical and of uniform diameter up to the knurled shoulder 12. The remainder of the body member may have the same construction as the body member shown in FIG. 1.

When making an assembly employing the body member of FIG. 6, a subassembly as shown in FIG. 3 is first produced. The nipple portion of the body member of FIG. 6 is then inserted with a slip fit into the assembly of FIG. 3 as far as it will go. This brings the enlarged forward portion 27 in front of the tapered end of the sleeve 19. An expanding tool can then be inserted to expand the enlargement 27 to the condition shown in FIG. 7 wherein it engages and interlocks with the sleeve 19. As seen in FIG. 7, the finished bore of the body member is uniform throughout.

In the final assembly as seen in FIG. 7, the outer diameter of the surface 28 of the body member should be such as to make a snug fit with the inwardly cuffed end of the conduit so as to trap the latter within the counterbore of the sleeve 19.

In order to avoid the need for an expanding tool, resort may be had to the modification shown in FIGS. 8 and 9. As seen therein, a body member 29 is provided having a nipple portion 30 provided with an annular external barb 31 longitudinally slotted at circumferentially spaced intervals for flexibility. Several of the slots 32 are seen in FIG. 8. Utilizing a subassembly as shown in FIG. 3, the body member 29 of FIG. 8 is forcibly inserted therein whereby the barb 31 contracts upon such insertion until the point of complete insertion whereupon the borb expands to effect the interlock condition shown in FIG. 9.

Having described the invention with reference to several presently preferred embodiments thereof, it will be appreciated that the various constructions are of simple configuration and are easy to use besides being less expensive to produce than fittings presently available. It will also be understood that various changes may be made in the details thereof without departing from the true spirit of the invention as defined in the appended claims.

What is claimed is:

1. An end fitting for attachment to the end of a thin-walled plastic conduit comprising a sleeve having one end externally tapered for insertion into the bore of said conduit, the opposite end of said sleeve being provided with a counterbore for receiving the end of said conduit upon its being cuffed inwardly about said opposite end of said sleeve, and a tubular body member having one end for insertion without rotation into the cuffed end of said conduit, said end of the body member having an external axial region which is coextensive with said counterbore upon said insertion and which at least initially upon insertion has a diameter less than that of said counterbore by approximately twice the nominal wall thickness of said conduit, and a region at the forward end of said end of the body member which is expandable radially outwardly to engage and interlock with the tapered end of said sleeve.

2. An end fitting according to claim 1, wherein the end of said tubular body member between said forward end and said axial region has an external annular channel having an axial extent at least as great as the noncounterbored portion of said sleeve, said axial region is provided with at least one annular rib, and said end of the tubular body member is expandable for embedding said rib in the end of said conduit compressing the latter against the wall of said counterbore and for receiving the noncounterbored portion of said sleeve in said channel.

3. An end fitting according to claim 2, wherein the end of said tubular body member has an internal diameter less than the diameter of the remainder of the body member whereby said end can be expanded by forcing an expanding tool therethrough.

4. An end fitting according to claim 1, wherein the forward end of the end of said tubular body member is provided with an annular external barb longitudinally slotted for flexibility whereby the barb contracts upon said insertion of the body member until the point of complete insertion whereupon the barb expands to effect said interlock.

5. An end fitting according to claim 1, wherein the end of said tubular body member is cylindrical and of uniform diameter terminating at its forward end in a radially inwardly directed enlargement which is deformable radially outwardly after insertion of said body member into said conduit end for effecting said interlock.

6. An end fitting and thin-walled plastic conduit assembly comprising in combination a sleeve having one end externally tapered and its opposite end formed with a counterbore, said conduit extending over said sleeve from said one end to said opposite end and reentrantly within said counterbore, and a tubular body member having a nipple portion extending completely through said sleeve, the region of said nipple portion which is coextensive with said counterbore having a plurality of axially spaced annular ribs embedded in the end of said conduit and compressing the latter against the wall of said counterbore, said nipple portion adjacent said region but within said sleeve having a diameter which makes a sliding fit with the overlying surface of said sleeve, and the end of said nipple portion extending beyond said sleeve having an increased diameter exceeding that of the internal diameter of said sleeve for engaging and interlocking with the tapered end of the latter.

References Cited

UNITED STATES PATENTS

| | | | |
|---|---|---|---|
| 1,915,041 | 6/1933 | Wallace | 285—258 |
| 1,928,836 | 10/1933 | Loughead | 285—258 X |
| 2,071,478 | 2/1937 | Wick | 285—258 |
| 2,550,583 | 4/1951 | Millar | 285—258 |
| 3,087,745 | 3/1959 | Rumbell | 285—149 |
| 3,380,764 | 4/1968 | Wilson | 285—249 |

FOREIGN PATENTS 1,197,381   6/1959   France.

THOMAS F. CALLAGHAN, Primary Examiner

U.S. Cl. X.R.

174—75, 89; 285—258